Figure 1:
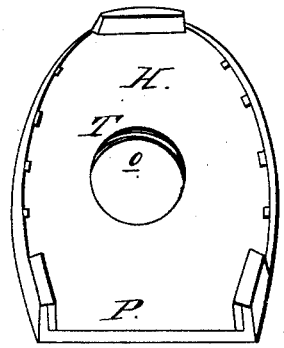
Figure 2:
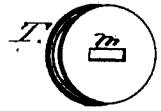

W. Cooper,

Horseshoe.

Nº 17,672.  Patented June 30, 1857.

UNITED STATES PATENT OFFICE.

WILLIAM COOPER, OF BROOKLYN, NEW YORK.

IMPROVED HORSESHOE.

Specification forming part of Letters Patent No. 17,672, dated June 30, 1857.

*To all whom it may concern:*

Be it known that I, WILLIAM COOPER, of the city of Brooklyn, county of Kings, and State of New York, have invented a new and useful Improvement in the Construction of Horseshoes; and I do hereby declare the following to be a full, clear, and exact description of the same, reference being had to the accompanying drawings, which drawings are lettered to correspond with and form a part of this specification.

The nature of my invention consists in so constructing a horseshoe as to cover and protect the entire bottom or sole of the hoof of a horse, at the same time to admit of medicated appliances being introduced to wounded or diseased parts through a finger-hole in the plate, which hole is so conjoined that it may be opened or closed as often as required by an appropriate screw-stopper without removing the shoe.

I construct my horseshoe H of any available metal, and place the stopper $q$ in any part of the plate of the shoe, as in the opening $o$, to which it is usually attached by cutting the threads T T on the stopper $q$ and in the sides of the opening $o$, thereby enabling me to secure the stopper firmly into the plate of the shoe. I sometimes arrange two or more openings with stoppers in different parts of the plate of the shoe, as may be required by different locations of disease in the hoof. I protect the stopper $q$ and continue it immovable in its place by screwing it firmly up to its bearings, both the stopper and the hole in the plate being cut a little beveling or tapering for that purpose.

To manipulate the stopper readily, I cut a screw-slot in the under side of the stopper $q$, sufficiently long to admit of the same being turned by a screw-driver or any other convenient substitute. I thereby open the base of the shoe readily at any time and examine the state of the hoof and make the desired veterinary appliances.

In fitting and operating these horseshoes I first nail the plate firmly to the hoof, as in ordinary shoeing. I then take out the stopper $q$ and insert the desired medicated appliances through the opening $o$, after which I close the opening with the stopper $q$, and to prevent any posterior oozing fill the interstices of the hoof around the back part of the frog, and between that and the shoe with tar and oakum or other materials, thus firmly capsulating the medicated material in the sole of the hoof in such manner as to permit the animal to be used without interfering with the required medical effect or receiving further injury. When I desire to remove the application I take out the screw $q$ and the rear packing of tar and oakum or other material, and clean the base of the hoof by forcing a jet of water between the shoe and the hoof from the back part, and through the interstices of the frog and the opening $o$, thereby preparing the foot for examination and fresh medication.

I am aware that plates of leather have been used to retain veterinary appliances in connection with the base of the hoof, the same being nailed beneath the shoe and covering the frog. These were, however, ineffective, as the shoe was required to be removed each time it became necessary to renew the inclosed medication or examine the state of the hoof. Likewise, the leather plate would not retain moist appliances, and being at the same time a non-conductor of heat, too much fever was retained in the integuments and tissues of the hoof. These difficulties do not attend the use of the movable-opening metallic-plate horseshoe, inasmuch as access is at all times obtainable to the sole of the hoof, when this shoe is applied, through the opening $o$ without removing the shoe, while foreign substances not required for veterinary uses are effectually shut out by closing the stopper $q$. The metallic plate, likewise, readily conducts and dissipates the fever or heat of the hoof.

I am likewise aware that perforated metallic-plate horseshoes have been previously used; still, these, being unprovided with the essential stopper, were soon packed with gravel and other irritating substances through the opening, which were with difficulty removed, thereby rendering such arrangement worse than useless.

I do not confine myself to shoes made from sheet-iron, as I sometimes require to adapt cast shoes to the feet of horses, such shoes being made of any desirable substance or metal. I also use any required number of openings in the base of the horseshoe.

I use the movable-opening metallic-plate horseshoe for the cure of all diseases of the legs and feet of horses, the requisite remedies being much more effectively applied for such cases by absorption through the delicate tissues of the foot than in any other manner.

I do not wish to confine myself to the screw-stopper, but desire to use that or any other convenient and effective stopper which may subserve the required purpose.

What I claim as my invention, and desire to secure by Letters Patent, is—

The use of a metallic-plate horseshoe covering the base of the hoof, having a suitable stopper fitting into a screwed opening in the same, or an equivalent therefor, constructed in the manner and for the purposes substantially as hereinbefore described.

WM. COOPER.

Witnesses:
 JAS. G. MORGAN,
 ELBERT CLOWES.